(12) United States Patent
Lee et al.

(10) Patent No.: US 8,172,969 B2
(45) Date of Patent: *May 8, 2012

(54) APPARATUS AND METHOD FOR ULTRASONIC PROCESSING OF LAMINATES

(75) Inventors: Edward W. Lee, Arlington, TX (US); Avraham Benatar, Upper Arlington, OH (US); David Grewell, Ames, IA (US)

(73) Assignees: Textron Innovations Inc., Providence, RI (US); The Ohio State University Research Foundation, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/013,318

(22) Filed: Jan. 25, 2011

(65) Prior Publication Data

US 2011/0114247 A1    May 19, 2011

Related U.S. Application Data

(63) Continuation of application No. 11/663,752, filed as application No. PCT/US2005/036490 on Oct. 11, 2005, now Pat. No. 7,892,372.

(60) Provisional application No. 60/617,288, filed on Oct. 8, 2004, provisional application No. 60/664,106, filed on Mar. 22, 2005.

(51) Int. Cl.
*B32B 37/00* (2006.01)

(52) U.S. Cl. ....... 156/64; 156/73.1; 156/359; 156/580.1

(58) Field of Classification Search .................... 156/64, 156/73.1, 358, 359, 580.1, 580.2; 700/299, 700/300, 301

See application file for complete search history.

(56) References Cited

U.S. PATENT DOCUMENTS

| 5,039,371 | A | 8/1991 | Cremens et al. |
| 6,432,236 | B1 | 8/2002 | Leemon et al. |
| 6,458,228 | B1 | 10/2002 | Yoshimoto |
| 6,585,839 | B2 | 7/2003 | Woods et al. |
| 7,892,372 | B2 * | 2/2011 | Lee et al. ........................ 156/64 |

(Continued)

FOREIGN PATENT DOCUMENTS

DE    4206584 A1    9/1993

(Continued)

OTHER PUBLICATIONS

Response to Supplementary European Search Report dated Apr. 22, 2010 from counterpart EP Application No. 05812004.

(Continued)

*Primary Examiner* — James Sells
(74) *Attorney, Agent, or Firm* — James E. Walton; Richard G. Eldredge

(57) ABSTRACT

A method for ultrasonic debulking a composite laminate includes the steps of defining a path across the laminate, the path having a starting location and an ending location and applying a force to and transmitting ultrasonic vibration into the laminate along the path, beginning at the starting location and ending at the ending location. The method further includes determining a temperature of a surface of the laminate proximate to the path and varying at least one of an amplitude of the ultrasonic vibration, the applied force, a feed rate at which the force and the ultrasonic vibration are applied along the path, an angle at which the ultrasonic vibration is applied to the laminate, and an interval at which plies of the laminate are processed, based upon the determined temperature of the surface of the laminate.

20 Claims, 9 Drawing Sheets

U.S. PATENT DOCUMENTS

2004/0060639 A1  4/2004  White

FOREIGN PATENT DOCUMENTS

| EP | 0007558 A | 6/1980 |
|---|---|---|
| JP | 63315223 A | 12/1988 |
| WO | 02/32664 A1 | 4/2002 |

OTHER PUBLICATIONS

Supplementary European Search Report dated Apr. 22, 2010 from counterpart EP Application No. 05812004.

Office Action dated Jun. 9, 2009 from corresponding U.S. Appl. No. 11/663,752.

Amendment dated Jun. 25, 2009 from corresponding U.S. Appl. No. 11/663,752.

Final Office Action dated Oct. 26, 2009 from corresponding U.S. Appl. No. 11/663,752.

Amendment After Final dated Dec. 11, 2009 from corresponding U.S. Appl. No. 11/663,752.

Office Action dated Jan. 4, 2010 from corresponding U.S. Appl. No. 11/663,752.

Rule 1.131 Affidavit dated May 28, 2010 from corresponding U.S. Appl. No. 11/663,752.

Final Office Action dated Aug. 19, 2010 from corresponding U.S. Appl. No. 11/663,752.

Amendment After Final dated Sep. 2, 2010 from corresponding U.S. Appl. No. 11/663,752.

Advisory Action dated Sep. 16, 2010 from corresponding U.S. Appl. No. 11/663,752.

Amendment After Final dated Sep. 22, 2010 from corresponding U.S. Appl. No. 11/663,752.

Notice of Allowance dated Oct. 12, 2010 from corresponding U.S. Appl. No. 11/663,752.

Canadian Office Action dated Apr. 7, 2010 from CA Application No. 2,580,995.

European Office Action from counterpart EP Application No. 05812004.9-2307, issued by the European Patent Office on Mar. 21, 2011.

* cited by examiner

| Treatment No. | Inputs | | | | | Outputs | |
|---|---|---|---|---|---|---|---|
| | Angle (deg) | Amplitude (μm) | Travel Speed (cm/sec) | Force (N) | Ply Interval | Thickness (mm) | Temperature (°C) |
| 1 | 0 | 15 | 2.54 | 35.6 | 7 | 7.167 | 32.6 |
| 2 | 0 | 15 | 2.54 | 111.2 | 4 | 6.930 | 37.8 |
| 3 | 0 | 15 | 1.27 | 35.6 | 4 | 6.984 | 36.3 |
| 4 | 0 | 15 | 1.27 | 111.2 | 7 | 6.774 | 44.6 |
| 5 | 0 | 30 | 2.54 | 35.6 | 4 | 7.043 | 49.8 |
| 6 | 0 | 30 | 2.54 | 111.2 | 7 | 6.881 | 54.0 |
| 7 | 0 | 30 | 1.27 | 35.6 | 7 | 6.908 | 50.2 |
| 8 | 0 | 30 | 1.27 | 111.2 | 4 | 6.685 | 86.4 |
| 9 | 45 | 15 | 2.54 | 35.6 | 7 | 7.192 | 36.3 |
| 10 | 45 | 15 | 2.54 | 111.2 | 4 | 7.131 | 35.2 |
| 11 | 45 | 15 | 1.27 | 35.6 | 4 | 7.066 | 39.6 |
| 12 | 45 | 15 | 1.27 | 111.2 | 7 | 6.655 | 46.1 |
| 13 | 45 | 30 | 2.54 | 35.6 | 4 | 7.024 | 49.5 |
| 14 | 45 | 30 | 2.54 | 111.2 | 7 | 6.829 | 77.1 |
| 15 | 45 | 30 | 1.27 | 35.6 | 7 | 6.781 | 65.2 |
| 16 | 45 | 30 | 1.27 | 111.2 | 4 | 6.642 | 74.3 |
| 17 | 0 | 15 | 2.54 | 35.6 | 7 | 7.353 | 30.7 |
| 18 | 45 | 30 | 1.27 | 111.2 | 7 | 6.579 | 78.9 |

FIG. 6

APPARATUS AND METHOD FOR ULTRASONIC PROCESSING OF LAMINATES

CROSS-REFERENCE TO RELATED APPLICATIONS

This application is a Continuation of U.S. application Ser. No. 11/663,752, filed on 26 Mar. 2007, titled "Apparatus and Method for Ultrasonic Processing of Laminates", which issued as U.S. Pat. No. 7,892,372 on 22 Feb. 2011, which claims the benefit of International Application No. PCT/US05/36490, filed on 11 Oct. 2005, titled "Apparatus and Method for Ultrasonic Processing of Laminates", which claims the benefit of U.S. Provisional Application No. 60/617,288, filed 8 Oct. 2004, titled "Ultrasonic Debulking of Composite Laminates; and U.S. Provisional Application No. 60/664,106, filed 22 Mar. 2005, titled "Development of an Ultrasonic Debulking Technique for Composite Laminates", all of which are hereby incorporated by reference for all purposes as if fully set forth herein.

BACKGROUND

1. Field of the Invention

The present invention relates to ultrasonic processing of laminates. In particular, the present invention relates to an apparatus and method for ultrasonic debulking or welding of laminates.

2. Description of Related Art

Laminate materials are widely used in many industries, such as the aerospace industry. Laminate materials include polymeric composite laminates, such as thermoplastic and thermosetting composite laminate materials, and metallic laminates. Many applications of such thermosetting composite materials are structural in nature, wherein the quality of the material is a critical factor. For example, it is desirable to eliminate air entrapped within uncured composite laminates prior to curing or consolidation.

Generally, manufacturing polymeric composite materials involves impregnating a polymeric resin into a volume surrounding a plurality of fibers, forming a layer or ply of fibers disposed in a matrix of resin. Often the impregnation process is accomplished prior to assembling or "laying up" a plurality of layers or plies into an assembly or "layup", which is subsequently heated or "cured" to form a product.

The impregnation process is critical in controlling air entrapped in a layup and the uncured thickness of impregnated material. An incomplete impregnation often results in air entrapment inside the composite material. Air can also be trapped between layers or plies of composite material during the layup process. Such trapped air causes the volume of an uncured part to be greater than that of a cured part. The volume of air entrapped in a part is known as "bulk." Excessive bulk often causes "marcels" and/or voids in cured composite parts. Marcels are fibers that become wavy during handling and/or curing because the fibers are pushed by excessive, unbalanced forces of the manufacturing process.

Bulk compaction or "debulking" at room temperature or with heat and under vacuum is a conventional practice used during part layup to curb bulk-induced quality anomalies. Conventionally, a debulking cycle includes touch labor associated with vacuum bagging the part, heating the part to and cooling the part from a debulking temperature, and unbagging the part. Such debulking cycles may require up to eight or more hours to complete. Moreover, the debulking temperature must be carefully selected so that the composite material is not significantly advanced or staged during the debulking process. Thicker composite parts often require multiple debulking cycles, which contribute significantly to the total part cycle time and cost.

One way of decreasing the amount of time to debulk a composite layup is to apply ultrasonic vibration to the layup. In this approach, an ultrasonic horn is engaged with a top surface of a stack of polymeric composite material layers or plies. The ultrasonic horn is energized to induce cyclical deformation in the plies to heat the plies, reduce the resin's viscosity, and enhance wetting of the fibers with resin. The vibrating horn is moved along the upper surface of the stack to consolidate the layers or plies. Moreover, the ultrasonic vibration helps entrapped gases to coalesce and form larger bubbles, which can be more easily pushed out under the "sweeping" motion of the vibrating ultrasonic horn. However, conventional ultrasonic debulking techniques may induce excessive heating of the composite material stack. Such excessive heating often results in inadvertent substantial cross-linking (i.e., curing) of thermosetting resin components. Moreover, such excessive heating may cause degradation of the resin and/or the polymeric composite material. Such deficiencies may cause degradation of the cured thermosetting composite part, resulting in reduced mechanical properties of the part.

Layers or plies of laminate materials may be ultrasonically welded to adjacent layers or plies. In such laminates, most designs require adjacent layers or plies to be welded across the entire adjacent surfaces. Conventional ultrasonic welding processes, however, do not compensate for in-process variations that may result in welded laminates that exhibit substandard quality.

While there are many procedures for ultrasonically processing laminate materials that are well known in the art, considerable room for improvement remains.

DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, in which the leftmost significant digit(s) in the reference numerals denote (s) the first figure in which the respective reference numerals appear, wherein:

FIG. 6 is a table providing a summary of design of experiments inputs and outputs;

Figure 1:
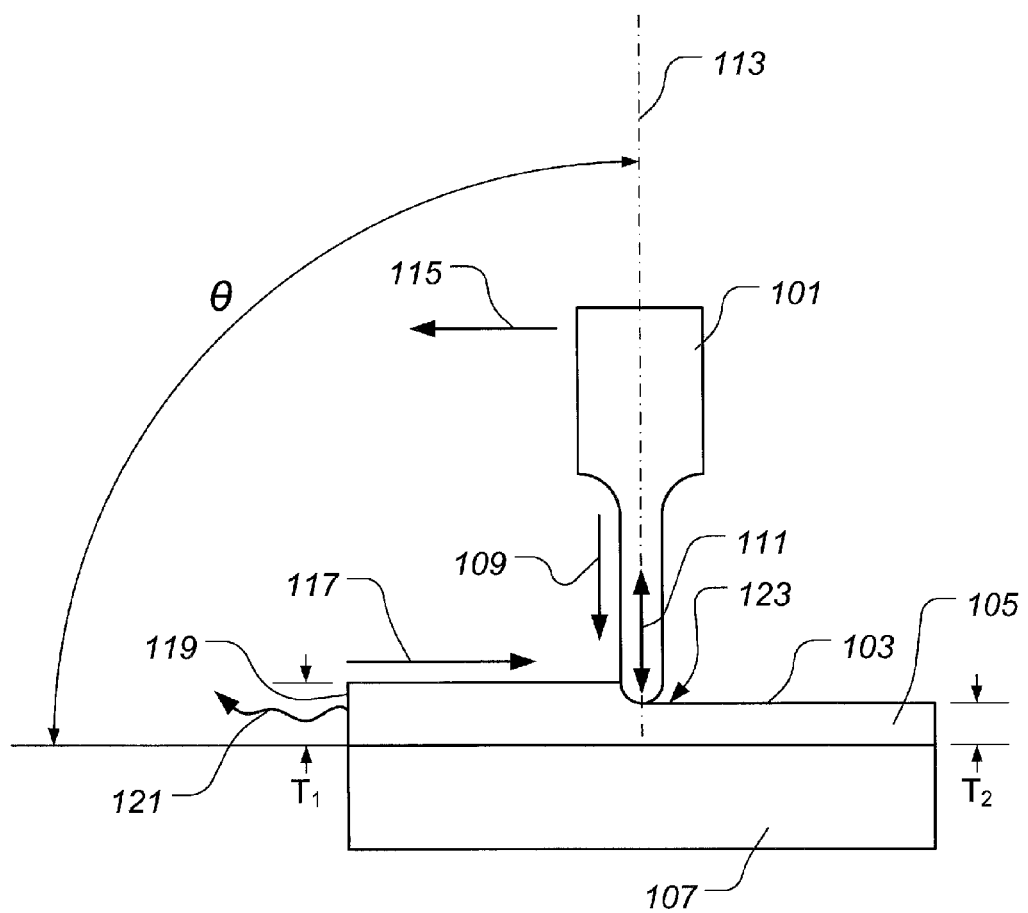
FIG. 1 is a stylized diagram illustrating one particular embodiment of a method of ultrasonically processing an uncured, composite laminate according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention represents an apparatus and method for ultrasonic processing of laminates. A polymeric composite laminate is made up of a plurality of layers or plies of fibers disposed in a matrix of polymeric resin. The polymeric resin may be a thermosetting resin or a thermoplastic resin. A metallic laminate is made up of a plurality of layers or plies of metallic material welded at interfaces between adjacent layers or plies. The term "processing", as used herein relating to polymeric laminates, means debulking (i.e., removing air from the uncured laminate) or joining layers or plies of the laminate. The term "processing", as used herein relating to metallic laminates, means joining layers or plies of the laminate.

According to a method of the present invention, ultrasonic vibration and force are applied along a path across a laminate. At least one of the amplitude of the ultrasonic vibration, the applied force, the feed rate at which the ultrasonic vibration and force are applied across the laminate, the angle at which the ultrasonic vibration is applied to the laminate, and the interval at which plies are processed is varied based upon the temperature of an upper surface of the laminate proximate to the location at which the ultrasonic vibration and force are being applied. In various embodiments, the method includes varying at least one of the amplitude of the ultrasonic vibration, the applied force, the feed rate at which the ultrasonic vibration and force are applied across the laminate, the angle at which the ultrasonic vibration is applied to the laminate, and the interval at which plies are processed using one or more of a proportional control methodology an integral control methodology, and a differential control methodology, based upon the temperature of the upper surface of the laminate proximate to the location at which the ultrasonic vibration and force are being applied. Note that fuzzy logic and neural network control methodologies may also be used. The control methodologies are applicable when the horn contacts the laminate surface at a wide range of angles or when the laminate includes thickness variations and ramps and mild curvatures. Note that the scope of the present invention encompasses method embodiments that vary other processing parameters, as will be discussed in greater detail below.

Moreover, the scope of the present invention encompasses an apparatus adapted to ultrasonically process a laminate, such that at least one of the amplitude of the ultrasonic vibration, the applied force, the feed rate at which the ultrasonic vibration and pressure are applied along a path across the laminate, the angle at which the ultrasonic vibration is applied to the laminate, and the interval at which plies are processed is varied based upon the temperature of an upper surface of the laminate proximate to the location at which the ultrasonic vibration and force are being applied. In one embodiment, the apparatus includes one or more of a proportional control, an integral control, and a differential control for varying at least one of the amplitude of the ultrasonic vibration, the applied force, the feed rate at which the ultrasonic vibration and force are applied across the laminate, the angle at which the ultrasonic vibration is applied to the laminate, and the interval at which plies are processed, based upon the temperature of the upper surface of the laminate proximate to the location at which the ultrasonic vibration and force are being applied. The apparatus may employ fuzzy logic and neural network control methodologies. Note that the scope of the present invention encompasses embodiments of the apparatus adapted to vary other processing parameters, as will be discussed in greater detail below.

FIG. 1 provides a stylized diagram illustrating one particular embodiment of a method of ultrasonically processing a laminate according to the present invention. In this method, an ultrasonic horn 101 is applied to an upper surface 103 of a laminate 105 disposed on a mandrel, fixture, tool or mold 107. It should be noted that the particular geometric representation of ultrasonic horn 101 in FIG. 1 is merely exemplary. Ultrasonic horn 101 is forced against upper surface 103 of laminate 105, as indicated by an arrow 109. Ultrasonic horn 101 ultrasonically vibrates, as indicated by an arrow 111, along an axis of vibration 113.

Still referring to FIG. 1, ultrasonic horn 101 travels with respect to laminate 105. Note that mold 107 and laminate 105 may remain stationary, with ultrasonic horn 101 moving with respect to laminate 105, as indicated by an arrow 115. Alternatively, ultrasonic horn 101 may remain stationary, with mold 107 and laminate 105 moving with respect to ultrasonic horn 101, as indicated by an arrow 117. In other embodiments, mold 107 and ultrasonic horn 101 may move, as indicated by arrows 115, 117, such that ultrasonic horn 101 moves relative to laminate 105. Axis of vibration 113 of ultrasonic horn 101 is oriented at angle θ with respect to laminate 105 and mold 107. while ultrasonic horn angel θ is illustrated in FIG. 1 as being substantially a right angle, the scope of the present invention is not so limited. Rather, ultrasonic horn angle θ may be any suitable angle, whether acute, obtuse, or right.

During ultrasonic processing, ultrasonic vibration is transmitted from ultrasonic horn 101, through top surface 103 of laminate 105, into laminate 105. When laminate 105 is a polymeric composite laminate, the ultrasonic vibration produces mechanical vibration and viscoelastic heating in composite laminate 105, which reduces the viscosity of the resin matrix. The reduced viscosity of the resin matrix, combined with the force exerted by ultrasonic horn 101 on composite laminate 105, compacts composite laminate 105 from a thickness $T_1$ to a thickness $T_2$, a debulked differential thickness being the difference between thickness $T_1$ and thickness $T_2$. Air entrapped within composite laminate 105 is pushed ahead of ultrasonic horn 101 into portions of composite laminate that have not been compacted. When sufficiently close to free edges of the composite material and of the composite laminate, such as an edge 119 of composite laminate 105, the entrapped air is freed to the atmosphere, as indicated by an arrow 121.

According to the present invention, compacted thickness $T_2$ of composite laminate is, in general, inversely proportional to a temperature of upper surface 103 of composite laminate 105 proximate to the interface between ultrasonic horn 101 and upper surface 103 (e.g., generally at 123 in FIG. 1) during ultrasonic debulking. Moreover, thickness $T_2$ is inversely proportional to the ultrasonic vibration amplitude and the force applied by ultrasonic horn 101 to composite laminate 105. Furthermore, thickness $T_2$ is directly proportional to the feed rate at which ultrasonic horn 101 is moved across composite laminate 105. Depending upon the implementation, the angle at which the ultrasonic vibration is applied to laminate 105 and/or the interval at which plies are processed are related to thickness $T_2$. Therefore, according to the present invention, thickness $T_2$, and thus the debulking process, is controlled by changing at least one of the ultrasonic vibration amplitude, the force applied by ultrasonic horn 101 to composite laminate 105, the feed rate at which ultrasonic horn 101 is moved across composite laminate 101, the angle at which the ultrasonic vibration is applied to laminate 105, and the interval at which plies are processed, based upon a temperature of upper surface 103 of composite laminate 105 proximate to the interface between ultrasonic horn 101 and upper surface 103. Note that thickness $T_2$ is the thickness of composite laminate 105 after debulking but prior to curing.

While the present invention has been described above relating in particular to debulking, the scope of the present invention is not so limited. Rather, the method described above in relation to FIG. 1 applies directly to joining adjacent layers or plies of polymeric composite materials or adjacent layers or plies of metallic materials to form a laminate. Specifically, the ultrasonic vibration amplitude and the force applied to a laminate by ultrasonic horn 101, the feed rate at which ultrasonic horn 101 is moved across a laminate, the angle at which the ultrasonic vibration is applied to a laminate and/or the interval at which plies are processed are related to the quality of the weld joining adjacent layers or plies. Therefore, according to the present invention, the welding process is controlled by changing at least one of the ultrasonic vibration amplitude, the force applied by ultrasonic horn 101 to a laminate, the feed rate at which ultrasonic horn 101 is moved across the laminate, the angle at which the ultrasonic vibration is applied to the laminate, and the interval at which plies are processed, based upon a temperature of an upper surface of the laminate proximate to the interface between ultrasonic horn 101 and the upper surface of the laminate.

Figure 2:
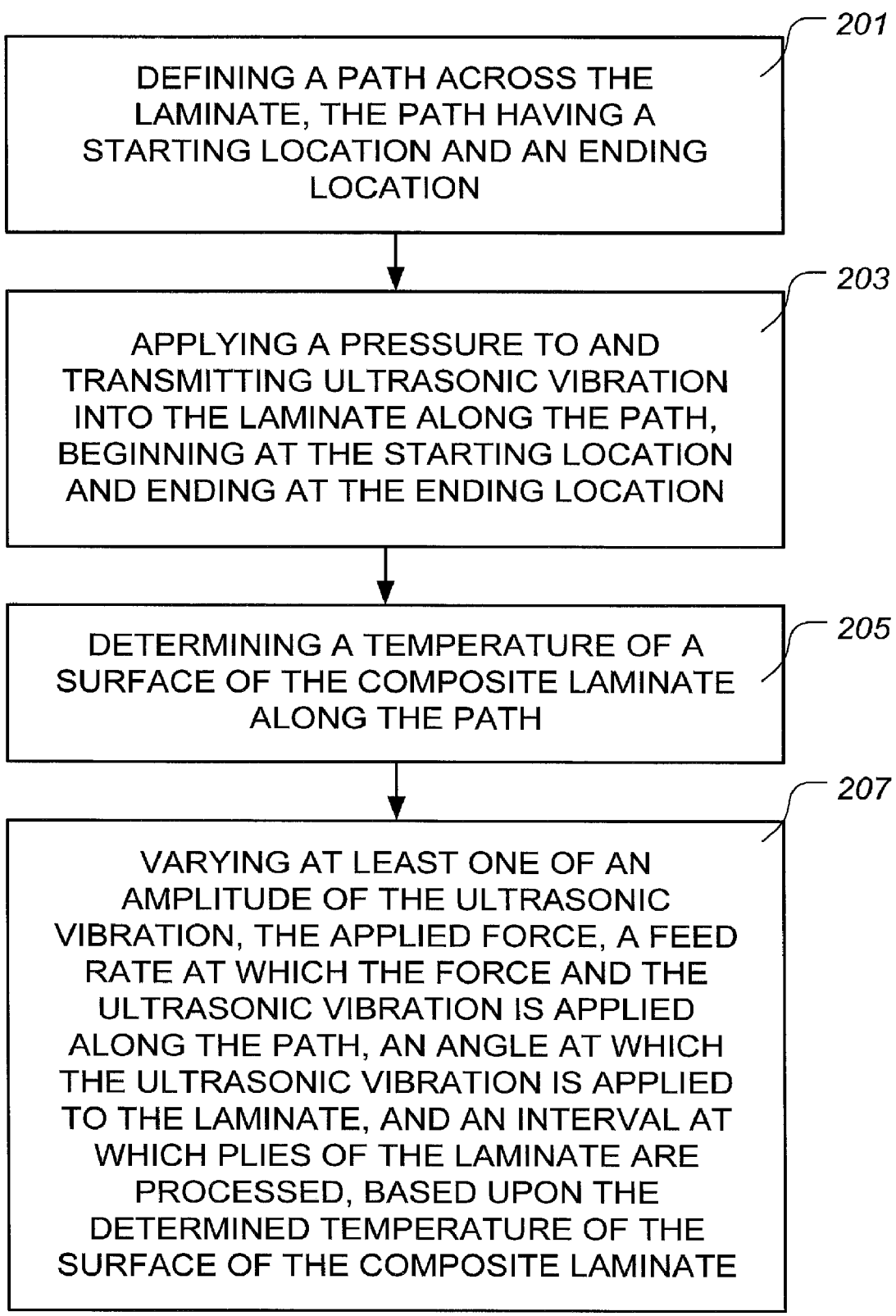
FIG. 2 is a flow chart illustrating one particular embodiment of an ultrasonic processing method according to the present invention.

As depicted in FIG. 2, one particular embodiment of the present invention is a method including the step of defining a path across a laminate, such as laminate 105 (block 201). The method further includes applying a force to and transmitting ultrasonic vibration into the laminate along the path, beginning at the starting location and ending at the ending location (block 203). The method further includes determining a temperature of a surface of the laminate proximate to the path (step 205). Moreover, the method includes varying at least one of an amplitude of the ultrasonic vibration, the force, a feed rate at which the force and the ultrasonic vibration are applied along the path, the angle at which the ultrasonic vibration is applied to the laminate, and the interval at which plies are processed, based upon the determined temperature of the surface of the laminate (block 207).

In one embodiment, the step of block 207 is carried out by at least one of a proportional control methodology, an integral control methodology, and a differential control methodology. As applied to the present invention, each of these methodologies is a closed-loop, feedback control methodology having one or more output control variables corresponding to the ultrasonic amplitude, the force exerted on composite laminate 105 by ultrasonic horn 101, the feed rate of moving ultrasonic horn 101 across composite laminate 105, the angle at which the ultrasonic vibration is applied to laminate 105, and/or the interval at which plies are processed. The one or more output control variables are based upon the error between a predefined temperature set point of upper surface 103 of composite laminate 105 and the actual temperature of upper surface 103 of composite laminate 105.

When the step of block 207 is carried out by a proportional control methodology, the difference between the actual temperature of upper surface 103 and a desired temperature of upper surface 103 is multiplied by a predetermined gain to produce one or more output control variables corresponding to the ultrasonic amplitude, the force exerted on composite laminate 105 by ultrasonic horn 101, the feed rate of moving ultrasonic horn 101 across laminate 105, the angle at which the ultrasonic vibration is applied to laminate 105, and/or the interval at which plies are processed. When the step of block 207 is carried out by an integral control methodology, the integral of the difference between the actual temperature of upper surface 103 and a desired temperature of upper surface 103 is multiplied by a predetermined gain to produce one or more output control variables corresponding to the ultrasonic amplitude, the force exerted on laminate 105 by ultrasonic horn 101, the feed rate of moving ultrasonic horn 101 across laminate 105, the angle at which the ultrasonic vibration is applied to laminate 105, and/or the interval at which plies are processed. When the step of block 207 is carried out by a differential control methodology, the rate of change of the difference between the actual temperature of upper surface 103 and a desired temperature of upper surface 103 is multiplied by a predetermined gain to produce one or more output control variables corresponding to the ultrasonic amplitude, the force exerted on composite laminate 105 by ultrasonic horn 101, the feed rate of moving ultrasonic horn 101 across composite laminate 105, the angle at which the ultrasonic vibration is applied to laminate 105, and/or the interval at which plies are processed. Note that two or more of the proportional control methodology, the integral control methodology, and the differential control methodology may be combined, such as in a proportional-integral-differential control methodology. The step of block 207 may be carried out using fuzzy logic and neural network control methodologies.

Figure 3:
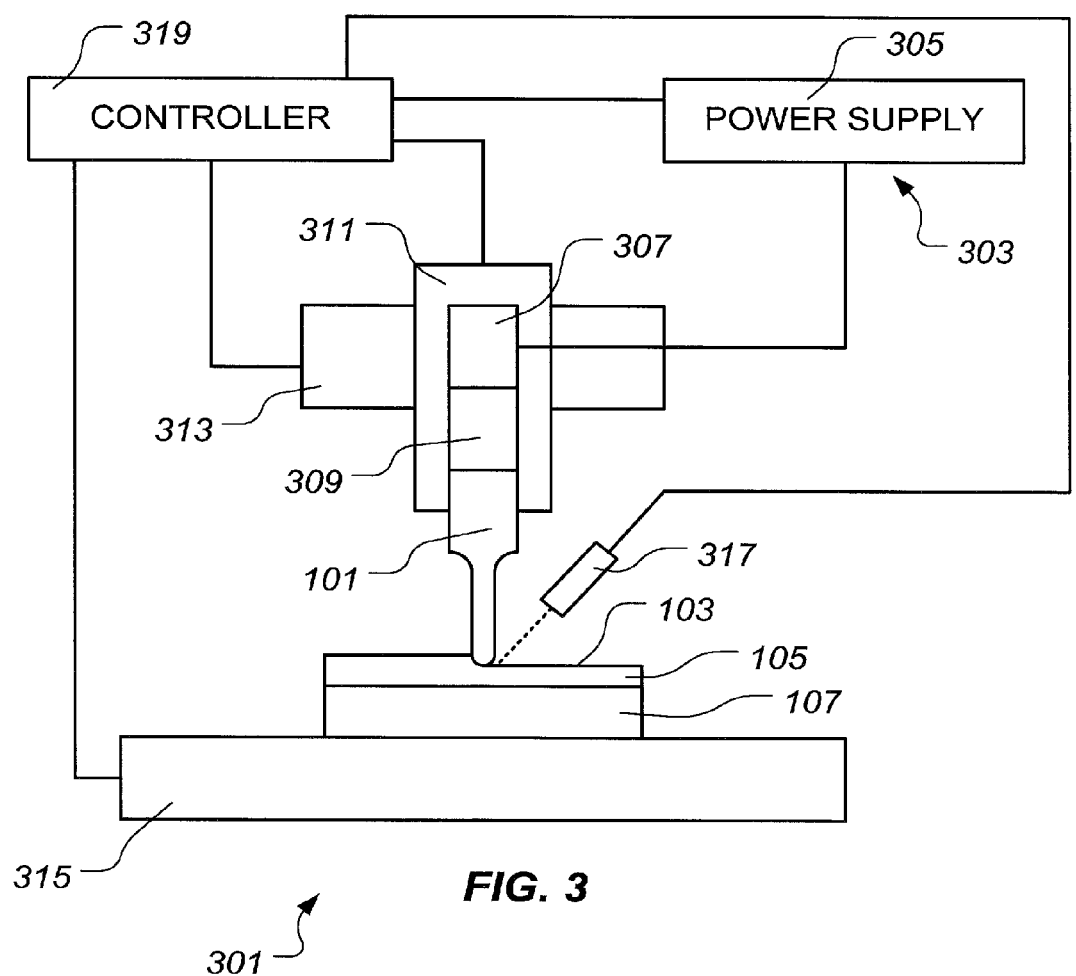
FIG. 3 is a stylized diagram of an illustrative embodiment of an apparatus for ultrasonic processing a composite laminate.

FIG. 3 depicts one particular embodiment of an apparatus 301 for ultrasonic processing of laminates. In the illustrated embodiment, apparatus 301 includes an ultrasonic device 303, such as an ultrasonic welding machine. Ultrasonic device 303 comprises a power supply 305 that converts electrical supply power, such as 120VAC, 50-60 Hz electrical power, to high frequency electrical energy. The frequency of the high frequency electrical energy is application specific but generally is within a range of about 10 KHz to about 50 KHz. In one embodiment, the frequency of the high frequency electrical energy is about 40 KHz. Power supply 305 is electrically coupled with a converter 307 that converts the high frequency electrical energy to mechanical motion at ultrasonic frequencies. The mechanical motion is then transmitted through an amplitude-modifying booster 309 to ultrasonic horn 101. Ultrasonic horn, an acoustic tool, transfers the vibratory energy to composite laminate 105.

Still referring to FIG. 3, apparatus 301 further includes an actuator 311 that forces ultrasonic horn 101 into contact with composite laminate 105. If it is desired for ultrasonic horn 101 to move with respect to composite laminate 105, as discussed above in relation to FIG. 1, apparatus 301 includes a positioner 313 for moving ultrasonic horn 101 with respect to composite laminate 105. If it is desired for composite laminate 105 to move with respect to ultrasonic horn 101, as discussed above concerning FIG. 1, apparatus 301 includes a positioner 315 for moving mold 107, and thus composite laminate 105, with respect to ultrasonic horn 101. Some embodiments of apparatus 301 include both positioners 313 and 315. It should be noted that the particular configuration of positioners 313, 315 are implementation specific. For example, ultrasonic horn 101 may be implemented on a composite tape laying head, a composite tow placement head, a composite fiber placement head, an ultrasonic welding head, or the like, wherein positioner 313 is a positioning apparatus for the composite tape laying head, the composite tow placement head, or the composite fiber placement head. Positioners 313, 315 may be single-axis or multi-axis positioners. Apparatus 301 further includes a temperature sensor 317 for sensing the temperature of upper surface 103 of laminate 105 proximate the interface between ultrasonic horn 101 and upper surface 103 of composite laminate 105.

By way of example and illustration, ultrasonic device 303 and one or more of positioners 313, 315 comprise but one means for transmitting ultrasonic vibration into laminate 105 along a path. Moreover, by way of example and illustration, actuator 311 and one or more of positioners 313, 315 comprise but one means for applying force to laminate 105 along a path. Note that the path may include slopes with varying angles of contact between the horn and laminate as well as variations in thickness and number of plies or layers within the laminate. Accordingly, positioner 313, positioner 315, or another orientation positioner may include for the capability of positioning ultrasonic horn 101 at a specific or variable angle of contact with respect to laminate 105.

A controller 319 is coupled with power supply 305 to control the amplitude of the ultrasonic vibration imparted to laminate 105 and is coupled with actuator 311 to control the amount of force applied to laminate 105 by ultrasonic horn 101. Controller is also coupled with one or more positioners 313, 315, depending on the particular embodiment, to control the position or feed rate of ultrasonic horn 101 with respect to laminate 105. Moreover, controller 319 is coupled with temperature sensor 317 to input the temperature sensed by temperature sensor 317. By way of example and illustration, temperature sensor 317 is but one means for determining a temperature of a surface of laminate 105. Temperature sensor 317 may be a contact sensor, such as a surface temperature probe, or a non-contact sensor, such as an infrared temperature sensor.

Controller 319 controls at least one of the amplitude of the ultrasonic vibration imparted to laminate 105, the force applied by ultrasonic horn 101 to laminate 105, and the feed rate at which ultrasonic horn 101 and laminate move with respect to one another based upon the temperature of upper surface 103 of laminate 105 proximate the interface between ultrasonic horn 101 and upper surface 103 of laminate 105, as discussed above concerning FIG. 1. By way of example and illustration, controller 319 is but one means for varying at least one of the following: an amplitude of the ultrasonic vibration, the force, and a feed rate at which the pressure and the ultrasonic vibration is applied along the path based upon the determined temperature of the surface of the laminate. Note that controller 319 may be a portion or section of a controller for controlling a composite tape laying machine, a composite tow placement machine, a composite fiber placement machine, an ultrasonic welding machine, or the like.

The present invention is applicable to controlling surface temperature of any substrate of any materials of which can be correlated to the quality objective of a process by varying at least one of the amplitude of the ultrasonic vibration, the applied force, the contact angle, the interval at which plies are processed, and the feed rate at which the force and the ultrasonic vibration is applied along the path based upon the determined temperature of the surface of the target substrate. Such quality objectives include, for example, the amount of bulk removed from a laminate, the quality of welds between adjacent layers or plies of a laminate, or the like. Note that, in some embodiments, the feed rate may be substantially zero, such that the ultrasonic vibration and pressure are applied at a location on the substrate, rather than along a path across the laminate.

In the development of the present invention, "design of experiments" ("DOE") were conducted to determine the effects of various ultrasonic debulking process parameters on debulked thicknesses of composite laminates. These experiments, with a two-level and five-factor box design, were used to evaluate the effect of ultrasonic debulking on unidirectional glass epoxy (E773/S2) laminates. Preimpregnated ("prepreg") sheets having dimensions of 152 mm×152 mm were precut and packaged in groups of 28 plies in sealed polyethylene bags, which were kept in a freezer until one to two hours prior to the experiments. During debulking, each prepreg layer was individually placed into a rectangular mold in alternating layers of zero degree and 90 degree orientations. The number of plies (N) placed in the mold between ultrasonic treatments was varied at two levels: four and seven plies. The final number of plies in the laminate was held constant at 28. The other parameters that were evaluated included:

- travel speed (R) of the ultrasonic horn across the composite laminate at about 1.27 centimeters per second and at about 2.54 centimeters per second;
- force (F) imparted by the ultrasonic horn on the composite laminate at about 35.6 Newtons and at about 111.2 Newtons;
- amplitude (A) of the ultrasonic vibration imparted by the ultrasonic horn on the composite laminate at about 15 micrometers peak-to-peak and at about 30 micrometers peak-to-peak; and
- mold to ultrasonic horn angle ($\theta$) at about zero degrees and at about 45 degrees.

The ultrasonic equipment used was a Dukane 40 kHz ultrasonic welding machine. Travel speed, force, and amplitude were calibrated to ensure that the level setting for the DOE parameters was correct and to note any discrepancy from the desired value. The pressure setting for the air cylinder determines the force applied by the Dukane ultrasonic welding machine. The applied force was calibrated using a Sensotec (Model 31) 445 Newton (100 pound-force) load cell. The amplitude of vibration along the tip of the horn was measured using a Polytec PI laser interferometer.

During ultrasonic debulking, the temperature on the surface of the treated plies was monitored using an Omega OS36-01 infrared ("IR") temperature sensor. The output of the IR sensor depends on the emissivity of the surface, and the sensor is generally calibrated for a narrow temperature range. The IR temperature sensor was calibrated by placing a hot plate with a prepreg layer with release paper under the ultrasonic horn, as would be done during ultrasonic debulking. A thermocouple surface temperature probe was also placed on the release paper, which provided a reference temperature to calibrate the IR sensor. Then the hot plate temperature was slowly raised while the IR and surface probe temperatures were recorded. Next, the hot plate was turned off and the temperatures were recorded during cooling as well. The IR temperature was then calibrated to the surface probe temperature.

The surface temperature $\phi$ of the top ply was measured using the IR thermal sensor. Debulked sample thickness $T_2$ was measured using a micrometer. The ultrasonically debulked samples were then cured using the conditions recommended by the material supplier. The cured samples were then tested for short beam shear strength and flexural modulus. The resulting data were then regressed using standard statistical methods.

Figure 4:
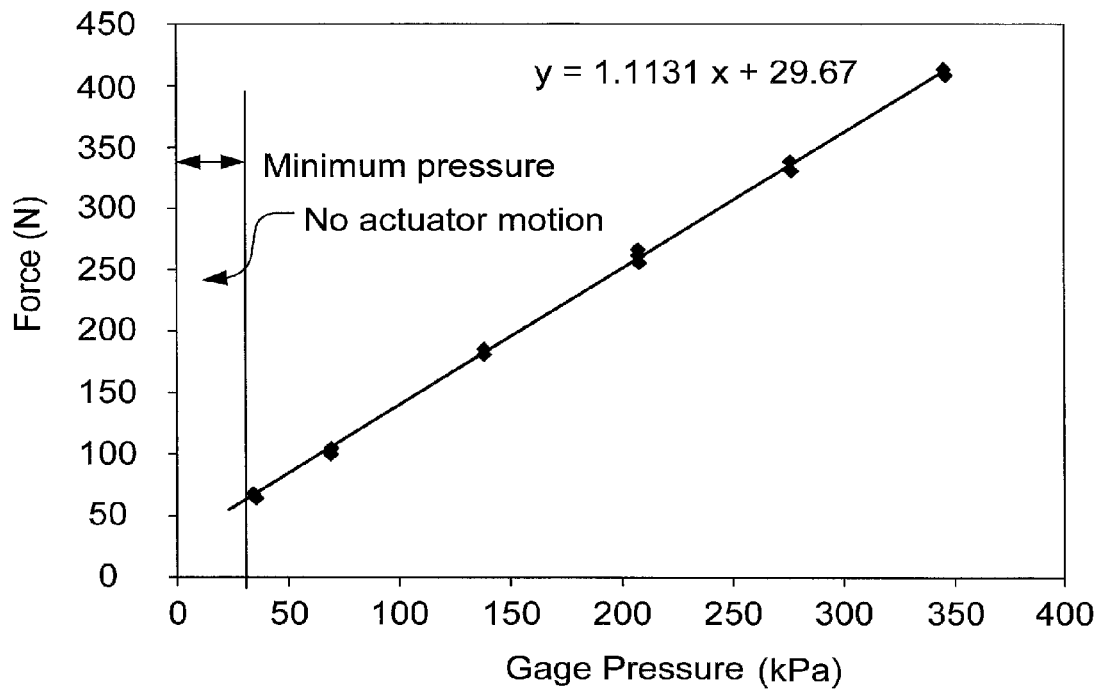
FIG. 4 is a graphical representation of force calibration data.
Figure 5:
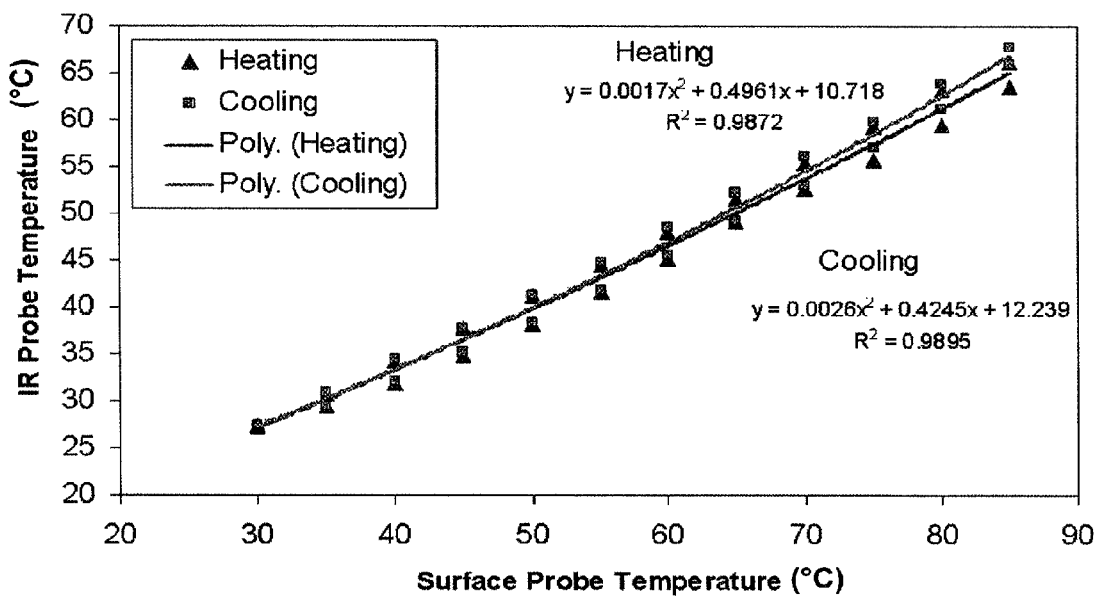
FIG. 5 is a graphical representation of infrared temperature sensor calibration data.

The force that was applied by the welder was calibrated using a Sensotec load cell, as shown in FIG. 4. It also shows the equation for least-square fit of the experimental data. FIG. 5 shows the calibration of the IR temperature sensor along with polynomial regression fit to the data for both heating and cooling. As can be seen, both heating and cooling curves were very close; nevertheless, the heating curve was used for determination of the absolute surface temperature from the IR temperature sensor readings.

As shown in FIG. 6, final thickness after treatment (but before final curing of the sample) is affected by rate, force, and amplitude. In more detail, the final thickness is inversely proportional to amplitude and force and directly proportional to speed. Higher amplitudes promote more heating and more squeeze flow during treatment, causing better debulking. The higher forces promote better debulking due to a combination of improved coupling of the horn to the prepreg as well as higher compressive pressure generated at the ply interfaces. A higher travel rate reduces the ultrasonic exposure time of the sample and thus reduces the heating, which in turn reduces the squeeze flow. The other parameters that were studied, horn angle and interval number, did not significantly affect the final post treatment thickness. Cross terms and higher order terms of the independent variables also did not significantly affect the final thickness. Thus, the final correlation between the thickness and process parameters was very good ($r^2$=0.971) and it is given by the following:

$$T = 7.03 + (0.183 \times R) - (0.003 \times F) - (0.011 \times A)$$

It is important to note that, while cross terms, such as F×A, were originally included, they were removed from the final model because they were statistically insignificant. In other implementations, however, the scope of the present invention encompasses the inclusion of such cross terms. Moreover, in other implementations, the horn angle and the interval number may be significant to the present invention. In such implementations, the horn angle and/or the interval number may be controlled to affect debulked laminate thickness.

Figure 7:
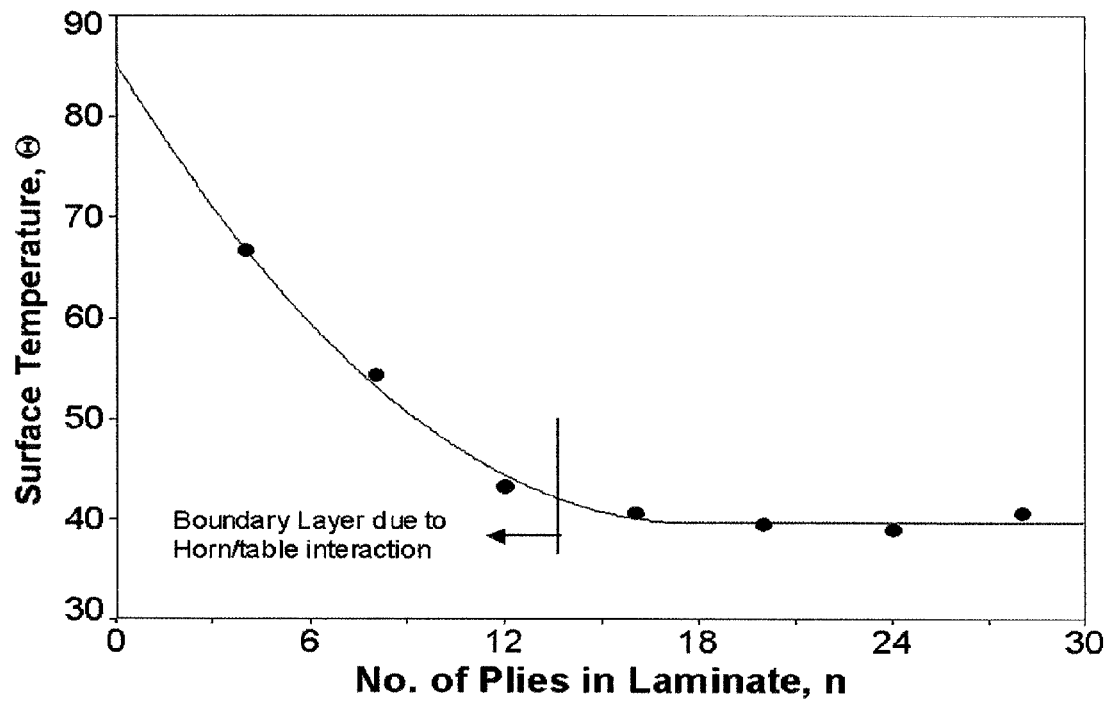
FIG. 7 is a graphical representation of maximum surface temperature as a function of the number of consolidated plies in a laminate.

In addition to thickness measurements, the surface temperature during ultrasonic debulking was also measured. Initially, an IR camera was used. The temperature drops off relatively quickly, once the horn passes a particular point. This suggests that the heating is localized at the top surface (horn/top layer interface)—that is to say, heat generation is not a bulk effect. Later, the IR temperature sensor was used to monitor the surface temperature of the prepreg ply while it was subjected to ultrasonic vibration and the maximum temperature was recorded. As shown in FIG. 7, the maximum surface temperature of the ply being ultrasonically treated decreased with increasing number of plies in the layup. This is probably due to the increase in compliance of the system and reduction of viscoelastic heating. Therefore, with the initial four plies, the surface temperature is highest, and it gradually decreases with application of additional plies. That is, application of the additional plies increases the compliance of the system and reduces the overall heating of the surface plies.

FIG. 6 also shows the maximum temperature for the first set of plies (four or seven plies) that was treated after correction using the calibration-heating curve for the IR temperature sensor (see FIG. 5). It is important to note that this temperature is only an indication of the temperature range that developed during ultrasonic debulking (see FIG. 7); but it enabled correlation between the input parameters and a single temperature. Therefore, the same statistical approach as described earlier for thickness was used to correlate the maximum surface temperature for the first set of plies with the input parameters. Here too, the correlation was very good ($r^2$=0.918), and the relationship is given by the following equation:

$$\phi = 25.307 + (1.668 \times A) - (2.058 \times N) + (0.008 \times A \times F) - (0.316 \times A \times R)$$

Surface temperature is greatly dependent on amplitude. It is also seen that for a given amplitude, the temperature is directly proportional to force and inversely proportional to rate. Increasing the force probably increases the mechanical coupling between the horn and laminate, increasing the overall efficiency of the energy transfer. Therefore, increasing the cross product of amplitude and force (A×F) also increases the temperature. In contrast, increasing the feed rate decreases the exposure time, reducing the heating time. This reduces the overall temperature and explains why increasing the cross product of amplitude and rate (A×R) reduces the temperature.

Figure 8:
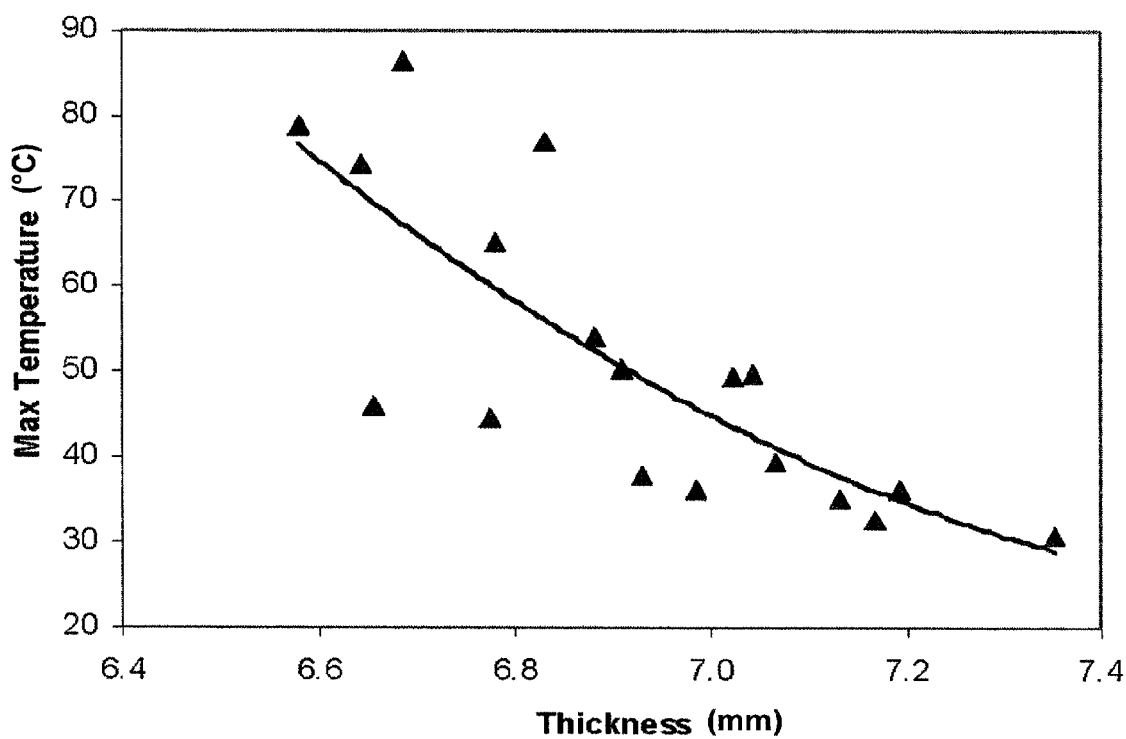
FIG. 8 is a graphical representation of a correlation between laminate thickness and laminate temperature.

Careful examination of the thickness and temperature columns from FIG. 6 shows that the thickness of the ultrasonically debulked laminate is inversely proportional to the temperature (see FIG. 8). As discussed earlier, this relationship would be expected because higher temperatures decrease the viscosity of the matrix, enabling more entrapped gasses to be squeezed out under the ultrasonic vibration. Since temperature can be easily measured, it could then be used to indirectly monitor (or control) the laminate thickness (and density) during ultrasonic debulking.

The cured laminates from the DOE were machined and tested to determine the short beam shear strength; then statistical analysis was performed on the results. It was found that the short beam shear test is independent ($r^2$=0.313) of the parameters studied in the ultrasonic debulking. That is to say, there is no significant evidence that any of the parameters affected the final results of the short beam shear tests. Because there was no relationship between dependent and independent parameters, no equation is presented. Therefore, the application of ultrasonic treatment did not degrade the short beam shear strength results; in fact, the average short beam shear strength of all the treated samples was 1.7% higher than the control group (untreated).

The cured laminates from the DOE were also machined and tested in flexure to determine the flexural modulus. Similar to the results of the short beam shear tests, there was no correlation between the ultrasonic debulking parameters and the flexural modulus ($r^2=0.085$). Since there was no significant relationship between the dependent and independent variables, no equation is presented. As with the short beam shear test, the average flexural modulus of all the treated samples was 3.1% higher than that of the untreated samples. Therefore, the ultrasonic treatment had no adverse affects on the flexural modulus.

The results of these experiments were incorporated into an exemplary method for ultrasonic debulking composite laminates. It was determined that the surface temperature had a significant influence on the debulking process, and might be used as an indicator of the laminate thickness. Therefore, it was decided to measure and control surface temperature by dynamically varying the amplitude of vibration. This required changing the ultrasonic welding machine to one with a power supply that permitted varying the amplitude in the range of 50 to 100% of the full amplitude, a Branson 40 kHz (Model 2000ae actuator and 2000t power supply). To control the amplitude dynamically, a Stanford Research Systems (SRS) (Model SIM960) proportional-integral-differential (PID) controller was used. The desired temperature was set in the SRS controller and initially only the proportional control portion of the SRS PID was implemented. The IR temperature sensor output was used as an input to the SRS controller, where it was compared with the set temperature to determine the error. The error between the desired and actual temperature was multiplied by the proportional gain to determine the output of the controller, which was used as the amplitude control voltage input to the Branson ultrasonic power supply. The SRS controller was adjusted to have a voltage offset that nominally applied 75% of the full amplitude; then the amplitude was increased or reduced, based on the proportional control, in order to maintain a constant temperature.

The amplitude of vibration of the Branson ultrasonic welder was measured as a function of the control voltage using a Polytec PI laser interferometer. Like the Dukane welder, setting the pressure on the air cylinder sets the force on the Branson welder; therefore, the force applied by the Branson welder was also calibrated using the Sensotec force transducer. From the calibration curve it was found that it was very difficult to set low forces (in the range of 75-150 N) using the pressure setting on the machine. The pressure gage on the machine had a scale ranging from 0 to 700 kPa, with the desired force requiring pressure settings in the range of 50-80 kPa, which is a very narrow range near the bottom of the gage. Prior to ultrasonic scanning, therefore, the Sensotec force transducer was used to set the air pressure for the actuator in the Branson welder to apply a constant force of 111.2 N (25 lb), and that setting was used for all ultrasonic debulking experiments.

To improve the response of the IR temperature sensor, a new fixture was designed and fabricated to hold the sensor closer to the laminate surface. The sensor was then calibrated using the hot plate and surface thermocouple probe, as described earlier. The temperature during each ultrasonic scan was recorded using a Metrabyte DAS-TC data acquisition board in an IBM PC.

For the closed-loop temperature control experiments, three composite laminates were debulked: one for determination of the gain on the SRS controller and two with target surface temperatures of 54° C. (130° F.) and 77° C. (170° F.). Initially, four plies were placed on the mold, and a relatively high travel speed was used (2 to 3 cm/s). Tests were then performed with the first laminate to determine the effect of different proportional gain settings on surface temperature. If the gain was too high, the temperature oscillated; if the gain was too low, there was an offset between the target and actual temperature. Once the gain was determined, the first four plies for the laminates with the target temperatures of 54° C. and 77° C. were ultrasonically debulked. Next, two plies were added to the first laminate and tests performed to select the appropriate gain. Then two plies were added to the laminates with the target temperatures of 54° C. and 77° C., which were ultrasonically debulked. This process was repeated every two plies. It was found that as more plies were added, the compliance of the system increased, requiring slower speeds in order to achieve the desired temperatures. However, after 10 to 14 plies were treated, adding additional plies did not change the impedance significantly, and the speed and gain were kept constant for all following plies until a 28-ply composite was consolidated.

Following ultrasonic debulking, the volume of the laminate was measured by weighing it in air and weighing it in water. Then, the density of the laminate was calculated by the dividing the weight in air by the volume. The laminate was then placed in a vacuum at 60° C. for 30 minutes to allow additional debulking. The laminate density was measured after the hot vacuum debulking step. Then the composite was cured and the density was measured again. The residual bulk in the laminate was then calculated from the difference between the density of the composite and that of the laminate following ultrasonic debulking.

Figure 9:
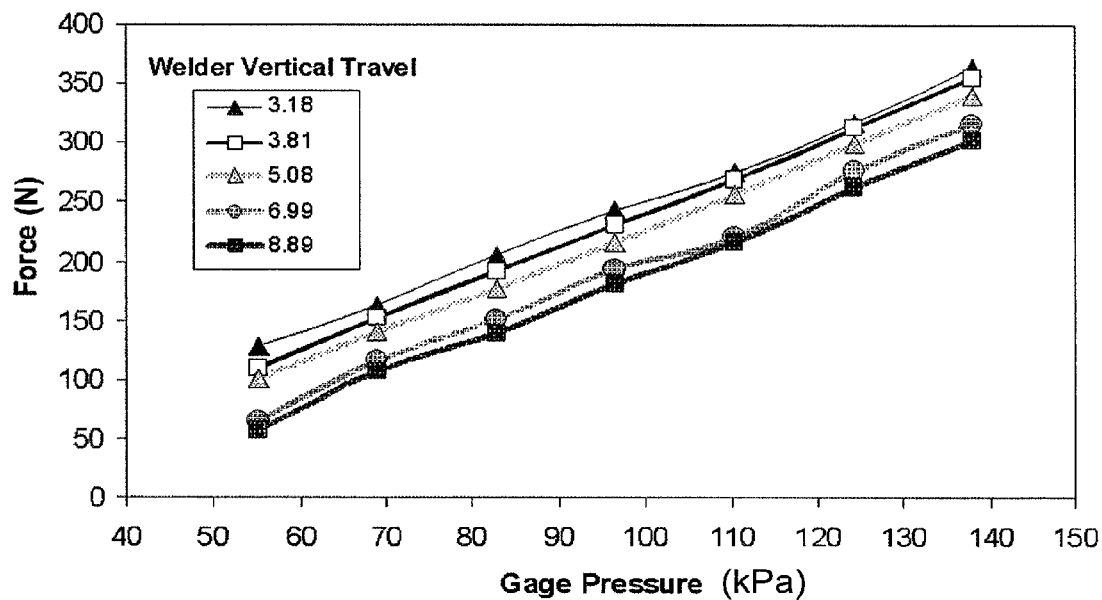
FIG. 9 is a graphical representation of force calibration data.
Figure 10:
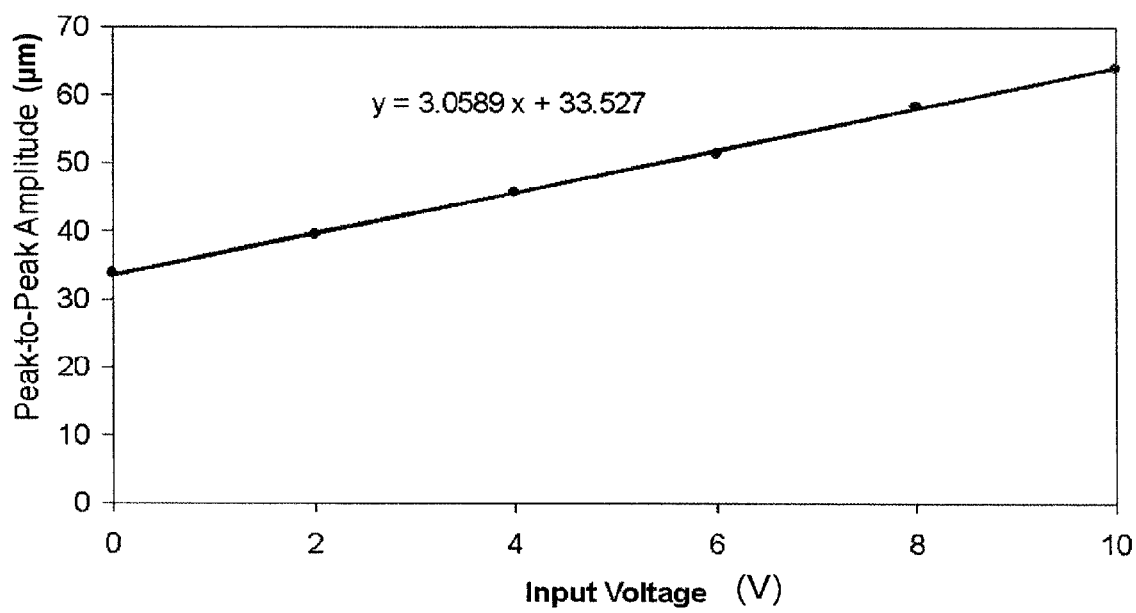
FIG. 10 is a graphical representation of amplitude of vibration calibration data.

As described earlier, an inverse correlation between the thickness and the maximum temperature during ultrasonic debulking of the first set of plies of the laminate was found (FIG. 8). This suggested that controlling the temperature during debulking could indirectly control the laminate thickness. Closed-loop temperature control could be implemented through control of the ultrasonic amplitude of vibration. This required using a Stanford Research Systems controller and a Branson 40 kHz welder with amplitude control capabilities, which required calibration of the force and amplitude of vibration for the Branson welder. FIG. 9 shows the calibration of the force for the Branson welder. Since this welder had a larger air cylinder than the Dukane welder, the forces were slightly dependent on travel distance for the stack, and they were much higher than the corresponding force levels for the Dukane welder. FIG. 10 shows that the amplitude of vibration of the welder varies linearly with the input control voltage. The linearity in the vibration-amplitude-to-input-control-voltage characterizes the welder performance, and it is important for tuning the closed-loop controller for proper amplitude control.

Figure 11:
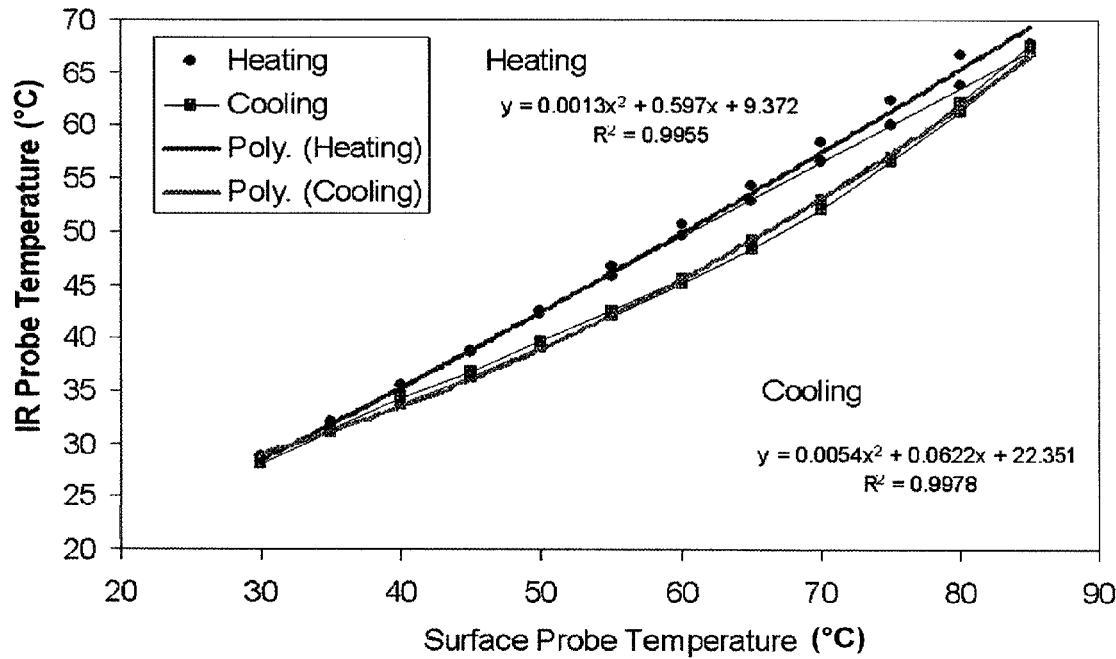
FIG. 11 is a graphical representation of infrared temperature sensor calibration data.
Figure 12:
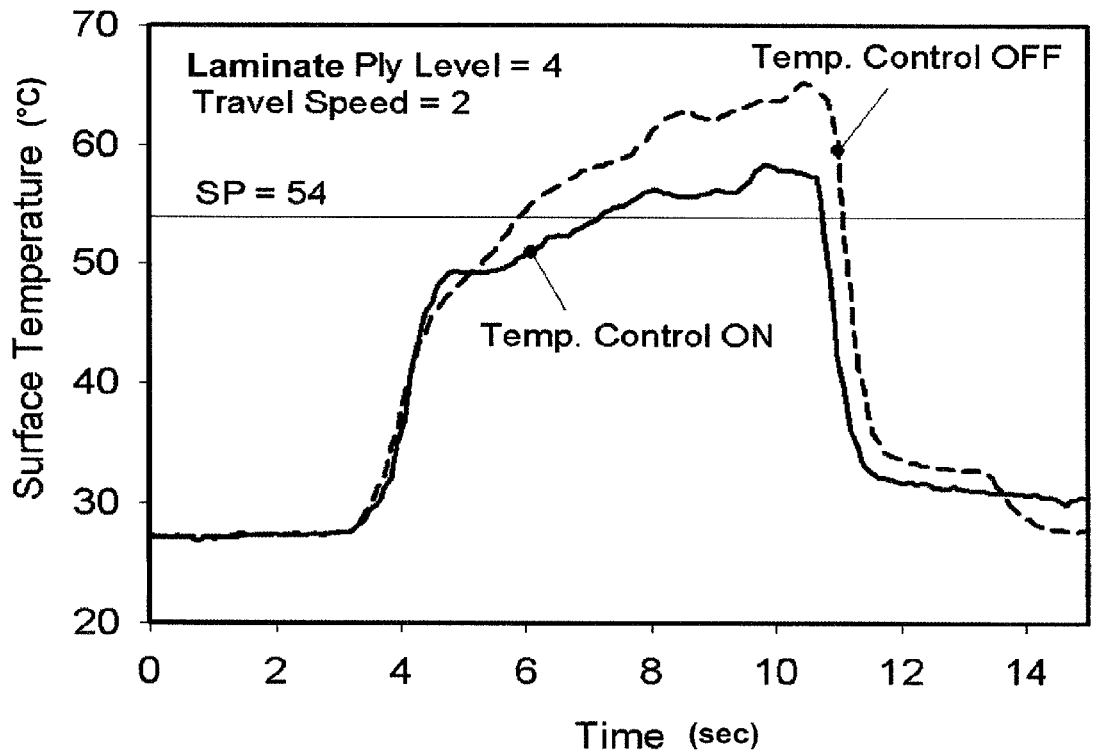
FIG. 12 is a graphical representation of an effect of closed-loop control on surface temperature at a first desired temperature.
Figure 13:
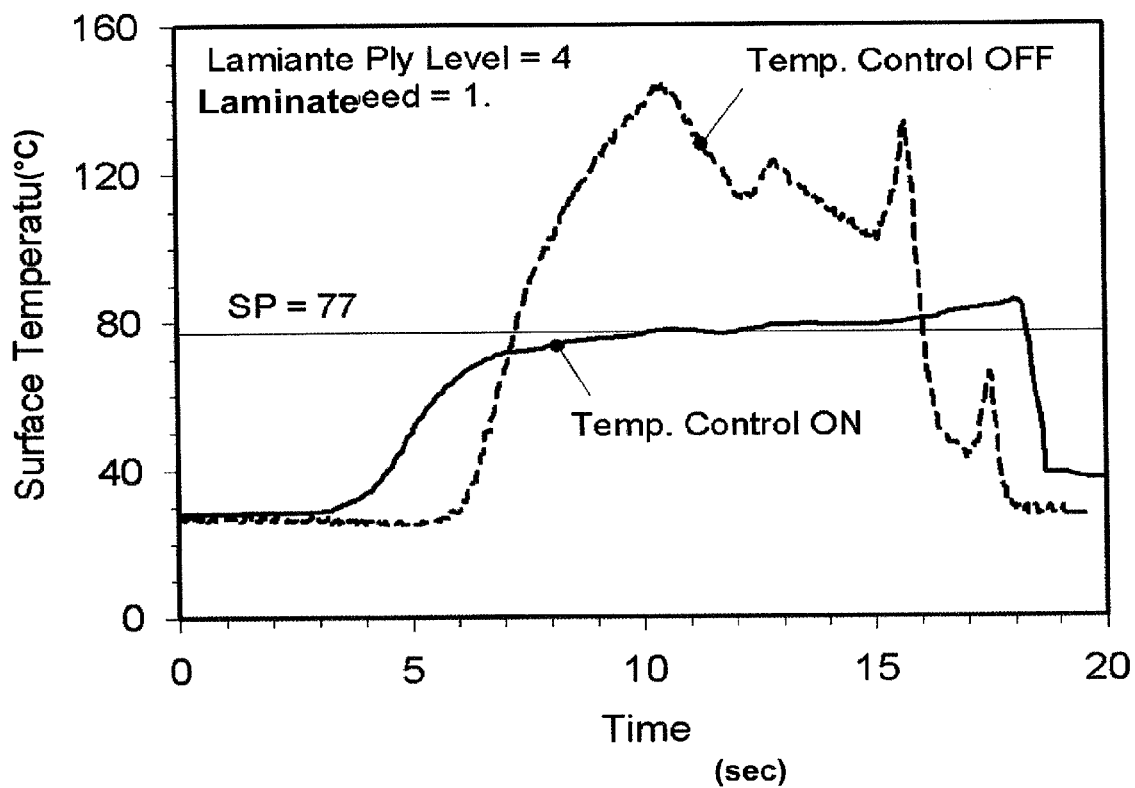
FIG. 13 is a graphical representation of an effect of closed-loop control on surface temperature at a second desired temperature.

As mentioned earlier, for these experiments the IR temperature sensor was moved closer to the surface and required recalibration. As shown in FIG. 11, there are again small differences between the heating and cooling curves. The curve fit from the heating curve was used to evaluate the absolute surface temperature. Initially, the surface temperature was measured as a function of time for a variety of travel speeds and amplitudes without implementation of temperature control. FIGS. 12 and 13 show the typical effect of closed-loop control on surface temperature when the desire temperature was set at 54° C. and 77° C., respectively. As shown in FIGS. 12 and 13, when temperature control is activated, after an initial rise time, the temperature reaches the desired level and then remains nearly constant at that level until the end of the sample is reached, where the temperature surpasses the set temperature by less than ten percent due to slowing down the table as it comes to a stop as well as edge effects.

Figure 14:
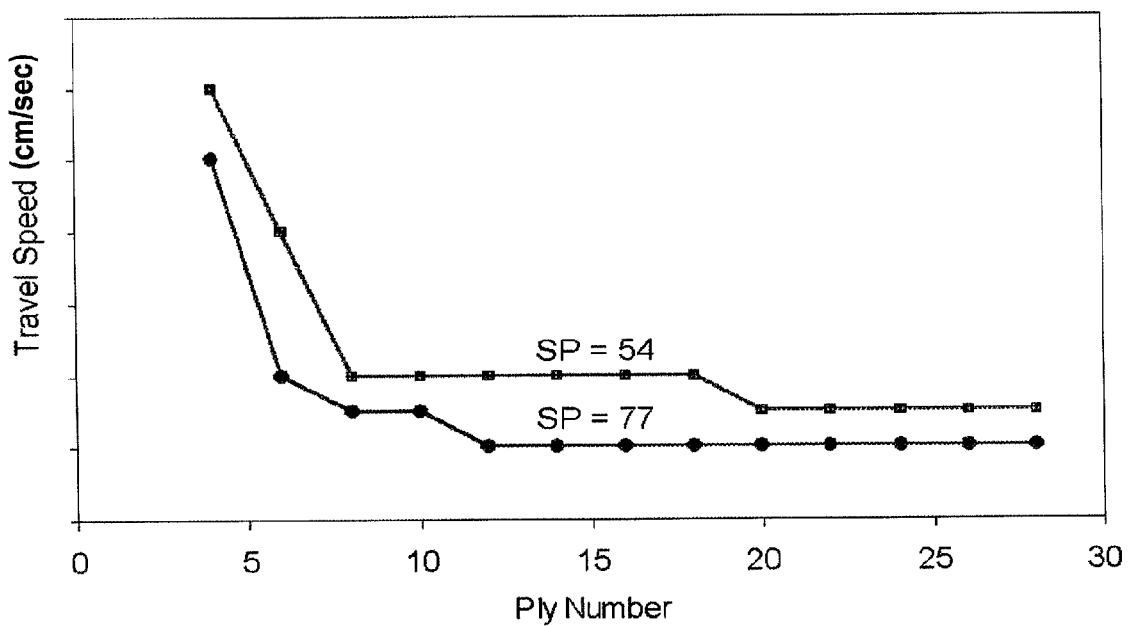
FIG. 14 is a graphical representation of different travel speeds for maintaining a desired set-point temperature at various ply levels.

FIG. 14 shows the travel speeds that were used to maintain the desired temperature for the two laminates. Initially, the speed was relatively high, but it was decreased as the number of plies increased. While debulking at 54° C. went very smoothly, debulking in this particular experiment at 77° C. resulted in numerous difficulties. Although the temperature was set to 77° C., the temperature frequently exceeded that temperature by as much as 10 to 15%, resulting in excessive resin squeeze-out—and sometimes even in fiber squeeze-out. A hot spot developed at one corner of the laminate after 10 plies were applied, and from that point on, that same location had a hot spot for all subsequent plies.

The density of the laminates was measured after the ultrasonic debulking. Both laminates were then hot debulked in vacuum at 60° C. for 30 minutes and the density was measured again. Finally, both laminates were cured and their density was measured again. The amount of resin squeeze-out during curing was determined by comparing the mass following hot debulking to that following curing. This way the resin squeeze-out could be included in the calculation of residual bulk. It was found that following ultrasonic debulking the residual bulk was 3.22% and 3.46% for the laminates that were debulked at 54° C. and 77° C., respectively. As mentioned above, debulking in this particular experiment at 77° C. was accompanied with numerous difficulties. Therefore, the residual bulk measurements for the 77° C. laminate may have errors relating to resin squeeze-out during ultrasonic debulking and the development of the hot spot. In general, ultrasonic debulking with closed-loop temperature control looks very promising, having reached a residual debulk of about 3.2%. In addition to proportional control, later experiments were performed using integral control, differential control and combinations of these three control methods. Note that fuzzy logic and neural network control may also or alternatively be employed.

Manufacturing of thermosetting composite materials involves a layup process of material layers or plies. Air trapped in the material and between material layers or bulk can cause marcels and voids in many rotorcraft composite parts. Bulk compaction or "debulking" with vacuum and heat is a conventional practice used during part layup to curb bulk-induced quality anomalies. Thick composite parts require multiple debulking cycles, which could contribute to a significant portion of the total cycle time and cost for a part. Therefore, ultrasonic debulking offers a low-cost alternative where debulking can be done using an ultrasonic head which follows the tape layup head. DOE experiments showed that ultrasonic debulking can reduce the thickness or residual bulk in a laminate very effectively. It was found that travel speed, travel force, and amplitude of vibration had the most significant effect on residual bulk. It was also found that ultrasonically debulked laminates had the same short beam shear strength and flexural modulus, showing that the ultrasonic vibration did not adversely affect the laminate.

Temperature measurements during ultrasonic debulking showed good correlation between the surface temperature of the laminate and its thickness. Therefore, closed-loop temperature control was implemented and used as an indirect indicator of thickness or residual bulk. As was found that with proportional control, selection of an appropriate gain was critical; too high gain resulted in temperature oscillations and too low gain resulted in a temperature offset. In general, it was possible to maintain the temperature within about 10 to 15% of the desired temperature. Experiments of ultrasonic debulking with closed-loop temperature control with set temperatures of 54° C. and 77° C. were performed. Closed-loop temperature control ultrasonic debulking at 54° C. worked very well and resulted in residual bulk of 3.22%. Closed-loop temperature control ultrasonic debulking in this particular experiment at 77° C. resulted in excessive squeeze-out of the matrix, and sometimes fibers, and in development of hot spots. Further work is needed to evaluate the effect of ultrasonic debulking process parameters on residual bulk when using closed-loop temperature control.

It should be noted that results obtained in the above particular experiments in no way limit the scope or utility of the present invention. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

It is apparent that an invention with significant advantages has been described and illustrated. Although the present invention is shown in a limited number of forms, it is not limited to just these forms, but is amenable to various changes and modifications without departing from the spirit thereof.

What is claimed is:

1. An apparatus for ultrasonically processing a laminate, comprising:
   an ultrasonic horn;
   an actuator operably associated with the ultrasonic horn, the actuator being adapted to move the ultrasonic horn into a laminate;
   a positioner operably associated with the ultrasonic horn, the positioner being adapted to move the ultrasonic horn relative to the laminate and adapted to move the laminate relative to the ultrasonic horn;
   a temperature sensor adapted to sense a temperature of a surface of the laminate;
   a controller operably associated with at least one of the ultrasonic device, the actuator, the positioner, and the temperature sensor to control, based upon a temperature sensed by the temperature sensor, at least one of:
      an amplitude of the ultrasonic vibration transmitted into the laminate;
      a force at which the ultrasonic horn is contacted with the laminate;
      a feed rate at which the ultrasonic horn is moved relative to the laminate and the laminate is moved relative to the ultrasonic horn; and
      an interval at which plies of the laminate are processed; and
   an orientation positioner for positioning the ultrasonic horn at an orientation relative to the laminate, such that the controller is operably associated with the orientation positioner to control, based upon a temperature sensed by the temperature sensor, an orientation of the ultrasonic horn relative to the laminate.

2. The apparatus according to claim 1, wherein the ultrasonic device further comprises:
   a power supply for supplying high frequency electrical energy;
   a converter for converting the high frequency electrical energy into ultrasonic frequency mechanical motion; and
   a booster for amplifying the amplitude of the ultrasonic frequency mechanical motion, the booster being coupled with the ultrasonic horn.

3. The apparatus according to claim 1, wherein the controller comprises:

at least one of a proportional controller, an integral controller, a differential controller, a fuzzy logic controller, and a neural network controller.

4. The apparatus according to claim 1, wherein the feed rate has a direct relationship to a debulked thickness of the laminate, when the laminate is a polymeric composite laminate.

5. The apparatus according to claim 1, wherein the amplitude of the ultrasonic vibration transmitted into the laminate and the force at which the ultrasonic horn is contacted with the laminate has an inverse relationship to a debulked thickness of the laminate, when the laminate is a polymeric composite laminate.

6. A method for ultrasonically processing a laminate, comprising the steps of:
defining a path across the laminate, the path having a starting location and an ending location;
applying a force to and transmitting ultrasonic vibration into the laminate along the path, beginning at the starting location and ending at the ending location;
determining a temperature of a surface of the laminate proximate to the path with a temperature sensor; and
varying at least one of an amplitude of the ultrasonic vibration, the applied force, a feed rate at which the force and the ultrasonic vibration are applied along the path, an angle at which the ultrasonic vibration is applied to the laminate, and an interval at which plies of the laminate are processed, based upon the determined temperature of the surface of the laminate;
controlling the movement of the ultrasonic horn with a controller;
positioning the ultrasonic horn at an orientation relative to the laminate with an orientation positioner such that the controller is operably associated with the orientation positioner to control, based upon a temperature sensed by the temperature sensor, an orientation of the ultrasonic horn relative to the laminate.

7. The method according to claim 6, wherein the step of applying the force to and applying ultrasonic vibration into the laminate is accomplished with an ultrasonic horn.

8. The method according to claim 7, wherein the step of determining the temperature of the surface of the laminate is accomplished proximate to an interface between the ultrasonic horn and the laminate.

9. The method according to claim 6, wherein the step of varying at least one of the amplitude of the ultrasonic vibration, the applied force, the feed rate at which the force and the ultrasonic vibration are applied, the angle at which the ultrasonic vibration is applied to the laminate, and the interval at which plies of the laminate are processed, is accomplished with at least one of a proportional control methodology, an integral control methodology, a differential control methodology, a fuzzy logic control methodology, and a neural network control methodology.

10. The method according to claim 6, wherein the method is carried out in conjunction with one of a composite tape laying process, a composite tow placement process, a composite fiber placement process, and an ultrasonic welding process.

11. The method according to claim 6, wherein the step of determining the temperature is accomplished using an infrared temperature detection technique.

12. The method according to claim 6, wherein the step of determining the temperature is performed continuously along the path.

13. The method according to claim 6, wherein the step of varying at least one of the amplitude of the ultrasonic vibration, the applied force, the feed rate at which the force and the ultrasonic vibration are applied, the angle at which the ultrasonic vibration is applied to the laminate, and the interval at which plies of the laminate are processed, controls a debulked thickness of the laminate.

14. The method according to claim 6, wherein, in the step of varying at least one of the amplitude of the ultrasonic vibration, the applied force, the feed rate at which the force and the ultrasonic vibration are applied, the angle at which the ultrasonic vibration is applied to the laminate, and the interval at which plies of the laminate are processed, the amplitude of the ultrasonic vibration is inversely proportional to a debulked thickness of the laminate.

15. The method according to claim 6, wherein, in the step of varying at least one of the amplitude of the ultrasonic vibration, the applied force, the feed rate at which the force and the ultrasonic vibration are applied, the angle at which the ultrasonic vibration is applied to the laminate, and the interval at which plies of the laminate are processed, the force applied to the laminate by the horn is directly proportional to the temperature of the surface of the laminate.

16. The method according to claim 6, wherein, in the step of varying at least one of the amplitude of the ultrasonic vibration, the applied force, the feed rate at which the force and the ultrasonic vibration are applied, the angle at which the ultrasonic vibration is applied to the laminate, and the interval at which plies of the laminate are processed, the force applied to the laminate by the horn is inversely proportional to a debulked thickness of the laminate.

17. The method according to claim 6, wherein, in the step of varying at least one of the amplitude of the ultrasonic vibration, the applied force, the feed rate at which the force and the ultrasonic vibration are applied, the angle at which the ultrasonic vibration is applied to the laminate, and the interval at which plies of the laminate are processed, the feed rate at which the force and the ultrasonic vibration are applied is inversely proportional to the temperature of the surface of the laminate.

18. The method according to claim 6, wherein, in the step of varying at least one of the amplitude of the ultrasonic vibration, the applied force, the feed rate at which the force and the ultrasonic vibration are applied, the angle at which the ultrasonic vibration is applied to the laminate, and the interval at which plies of the laminate are processed, the feed rate at which the force and the ultrasonic vibration are applied is directly proportional to a debulked thickness of the laminate.

19. The method according to claim 6, wherein the method is carried out to weld adjacent layers of one of a thermoplastic composite laminate and a metallic laminate.

20. The method according to claim 6, further comprising the step of:
correlating a quality objective to the surface temperature of the laminate.

* * * * *